(12) United States Patent
Toyoda et al.

(10) Patent No.: US 11,541,928 B2
(45) Date of Patent: Jan. 3, 2023

(54) STEERING APPARATUS FOR A VEHICLE

(71) Applicant: TOYOTA JIDOSHA KABUSHIKI KAISHA, Toyota (JP)

(72) Inventors: Hiroyuki Toyoda, Mie-ken (JP); Ruriko Sakaguchi, Toyota (JP); Hironobu Fukuta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 17/064,131

(22) Filed: Oct. 6, 2020

(65) Prior Publication Data
US 2021/0101637 A1   Apr. 8, 2021

(30) Foreign Application Priority Data
Oct. 8, 2019   (JP) .............................. JP2019-185320

(51) Int. Cl.
*B62D 5/04* (2006.01)

(52) U.S. Cl.
CPC ......... *B62D 5/0463* (2013.01); *B62D 5/0484* (2013.01)

(58) Field of Classification Search
CPC .................................................. B62D 5/0463
See application file for complete search history.

(56) References Cited

U.S. PATENT DOCUMENTS

| 4,880,074 A | * | 11/1989 | Matsumoto | ............ | B62D 5/008 |
| | | | | | 180/444 |
| 2009/0095565 A1 | * | 4/2009 | Tashiro | ................ | B62D 5/0472 |
| | | | | | 180/446 |
| 2020/0290665 A1 | | 9/2020 | Toyoda et al. | | |

FOREIGN PATENT DOCUMENTS

| JP | H0725345 A | * | 1/1995 |
| JP | 2002249055 A | * | 9/2002 |
| JP | 2004243988 A | * | 9/2004 |
| JP | 2004243995 A | * | 9/2004 |
| JP | 2019-038383 A | | 3/2019 |

OTHER PUBLICATIONS

U.S. Appl. No. 16/815,310, filed Mar. 11, 2020.

* cited by examiner

*Primary Examiner* — Jacob D Knutson
(74) *Attorney, Agent, or Firm* — Sughrue Mion, PLLC

(57) ABSTRACT

A steering apparatus includes left and right swing arm members, left and right tie rods pivotally attached to the arm portions of the swing arm members at their inner ends, relay rods pivotally attached to the arm portions at both ends, and a steering input transmission system. Rack-and-pinion type electric power steering devices are connected to the arm portions of the left and right swing arm members. A control unit calculates correcting steering torques for reducing rotational vibrations generated in the electric power steering devices due to a disturbance, and correct target steering assist torques calculated based on a steering torque with the correcting steering torques and control the electric power steering devices with the corrected target steering assist torques.

8 Claims, 8 Drawing Sheets

STEERING APPARATUS FOR A VEHICLE

CROSS-REFERENCE TO RELATED APPLICATION

This application claims priority to Japanese Patent Application No. JP2019-185320 filed on Oct. 8, 2019, the content of which is hereby incorporated by reference in its entirety into this application.

BACKGROUND

1. Technical Field

The present disclosure relates to a steering apparatus for a vehicle such as an automobile.

2. Description of the Related Art

As one of the steering apparatuses for vehicles such as automobiles, a steering apparatus has been known that is provided with a steering link mechanism, including left and right swing arm members and a relay rod connecting arm portions of the swing arm members and is configured so that swing motions of the left and right swing arm members are transmitted to the left and right wheels, respectively. Steering input applied to a steering input transmission system by a driver is converted by a motion conversion device to swing motion and it is transmitted to one swing arm member to steer left and right wheels. This type of steering apparatus is suitable for a large vehicle such as a bus.

For example, Japanese Patent Application Laid-open Publication No. 2019-38383 discloses a steering apparatus that has the above-described steering link mechanism, and is provided with left and right recirculating ball-type steering gears (hereinafter referred to as "RBS") and left and right electric motors that apply assist torque to corresponding RBSs. A rotary motion of each electric motor is converted into a linear motion of a rack by the RBS, the linear motion of the rack is converted into a swing motion of an arm by a sector gear that meshes with the rack, and the swing motion of the arm is transmitted to the corresponding swing arm by a drag link.

According to this type of steering apparatus, torques generated by the left and right electric motors can be applied to the left and right swing arm members as assist torques via the left and right RBSs, racks, sector gears, arms, and drag links. Therefore, as compared with a steering device that has the above-described steering link mechanism but the assist torque applying device is provided only on one of the left and right sides, the steering assist can be smoothly performed, and the left and right wheels can be smoothly steered as necessary.

The conventional steering device described in the Japanese Patent Application Laid-open Publication has a problem that efficiencies of motion conversion and torque transmission between the rotational motion and the swing motion by the RBS, the racks, the sector gears, the arms, and the drag links is not high. Therefore, in place of the RBSs, the racks, the sector gears, the arms, and the drag links to which the assist torques are applied by the electric motors, it may be considered to apply assist torques to the left and right swing arm members by the left and right rack-and-pinion type electric power steering devices.

However, since the rack-and-pinion type electric power steering device achieves the motion conversion between the rotational motion and the linear motion by the pinion and the rack teeth that mesh with each other, efficiency with which the linear motion of the rack bar is converted into the rotational motion of the pinion shaft, that is, the conversion efficiency of a reverse input is also relatively high. Therefore, when an assist torque is applied to the swing arm member by the rack-and-pinion type electric power steering device, rotational vibration resulting from reverse inputs of disturbance from the left and right wheels is likely to be transmitted to the steering wheel, which may cause a new problem that a driver easily feels discomfort depending on the situation.

SUMMARY

The present disclosure provides a steering apparatus which is improved so that steering assist and wheel steering can be performed smoothly as compared with a conventional steering apparatus, and rotational vibration caused by disturbance can be effectively suppressed.

According to the present disclosure, a steering apparatus for a vehicle is provided which comprises left and right swing arm members each having an arm portion that swings about an axis extending in the vertical direction, a relay rod pivotally connected to the arm portions of the left and right swing arm members at both ends, left and right tie rods respectively pivotally connected to left and right steered wheels, respectively, at outer ends and the relay rods or the arm portions of the left and right swing arm members, respectively, at inner ends, a steering input transmission system that is configured to transmit a steering input given to a steering wheel to one of the swing arm members.

The steering apparatus comprises a first rack-and-pinion type electric power steering device having a first rack bar connected to the arm portion of the one swing arm member, a second rack-and-pinion type electric power steering device having a second rack bar connected to the arm portion of the other swing arm member, a steering torque detecting device that is configured to detect a steering torque applied to the steering input transmission system via the steering wheel, and a electronic control unit that is configured to calculate first and second target steering assist torques based on at least the steering torque detected by the steering torque detecting device and control the first and second electric power steering devices based on the first and second target steering assist torques, respectively.

The electronic control unit is configured to detect a rotational vibration generated in at least the first electric power steering device due to a disturbance, calculate a correcting steering torque for reducing the rotational vibration, and correct at least the first target steering assist torque with the correcting steering torque.

According to the above configuration, assist torques are applied to the one and the other swing arm members by the rack-and-pinion type first and second electric power steering devices, respectively. Therefore, as compared to a steering device in which an assist torque is applied only to one of the left and right swing arm members, steering assist can be performed more smoothly and left and right wheels can be smoothly steered as necessary.

According to the above configuration, the first and second electric power steering devices are respectively controlled based on the first and second target steering assist torques calculated based on the steering torque. Further, a rotational vibration that is generated in at least the first electric power steering device due to a disturbance externally inputted is detected, a correcting steering torque for reducing the rotational vibration is calculated, and at least the first target steering assist torque is corrected by the correcting steering torque. Therefore, the rotational vibration caused by the disturbance can be reduced by a damping torque corresponding to the correcting steering torque, and the possibility that a driver feels uncomfortable due to the transmission of the rotational vibration to the steering wheel can be reduced.

In one aspect of the present disclosure, the electronic control unit is configured to calculate first and second correcting steering torques for reducing rotational vibration generated in the first electric power steering device and correct the first and second target steering assist torques with the first and second correcting steering torques, respectively.

According to the above aspect, first and second correcting steering torques for reducing the rotational vibration generated in the first electric power steering apparatus are calculated, and the first and second target steering assist torques are corrected by the first and second correcting steering torques, respectively. Therefore, as compared to where only the first target steering assist torque is corrected by the correcting steering torque, the rotational vibration transmitted from the other swing arm member to the steering input transmission system via the relay rod and the one swing arm member can be effectively reduced. Thus, it is possible to effectively reduce the possibility that the driver feels uncomfortable.

In another aspect of the present disclosure, the electronic control unit is configured to calculate first and second correcting steering torques for reducing rotational vibration generated in the first electric power steering device, correct the first target steering assist torque with the first correcting steering torque, modify the second correcting steering torque so that the phase of the second correcting steering torque advances with respect to the first correcting steering torque, and correct the second target steering assist torque with the modified second correcting steering torque.

For example, even if disturbances are simultaneously inputted to the left and right steered wheels, the rotational vibration transmitted from the other swing arm member to the first electric power steering device via the relay rod and the one swing arm member is detected later than the rotational vibration transmitted from the one swing arm member to the first electric power steering device. Therefore, it is preferable that the phase of the second corrected steering torque should lead the phase of the first corrected steering torque.

According to the above aspect, the first target steering assist torque is corrected by the first correcting steering torque, the second correcting steering torque is modified so that the phase of the second correcting steering torque advances with respect to the first correcting steering torque, and the target steering assist torque is corrected by the modified second correcting steering torque. Therefore, since the phase of the second correcting steering torque after modification is ahead of that of the first correcting steering torque, as compared to where the phase of the second correcting steering torque is not modified, it is possible to effectively reduce the rotational vibration transmitted from the other swing arm member to the steering input transmission system via the relay rod and the one swing arm member.

Further, in another aspect of the present disclosure, the electronic control unit is configured to calculate a correcting steering torque of the entire vehicle for reducing rotational vibration generated in the first electric power steering device and calculate first and second correcting steering torques based on the correcting steering torque of the entire vehicle so that the first correcting steering torque is larger than the second correcting steering torque.

If the first and second electric power steering devices are controlled based on the first and second target steering assist torques corrected by the first and second correcting steering torques, respectively, the rotational vibrations can be reduced by the damping torques corresponding to the first and second correcting steering torques. However, the degree of contribution of the rotational vibration in the first electric power steering device to the rotational vibration of the steering wheel is higher than the degree of contribution of the rotational vibration in the second electric power steering device. Therefore, the first correcting steering torque should be larger than the second correcting steering torque.

According to the above aspect, a correcting steering torque of the entire vehicle for reducing the rotational vibration is calculated, and the first and the second correcting steering torques are calculated based on the correcting steering torque of the entire vehicle so that the first correcting steering torque is larger than the second correcting steering torque. Therefore, the rotational vibration of the steering wheel can be effectively reduced as compared to where the first correcting steering torque is less than or equal to the second correcting steering torque.

Further, in another aspect of the present disclosure, the electronic control unit is configured to determine first and second rotational vibrations generated in the first and second electric power steering devices, respectively, calculate first and second correcting steering torques for reducing the first and second rotational vibrations, respectively, control the first electric power steering device based on the first target steering assist torque corrected by the first correcting steering torque, and control the second electric power steering device based on the second target steering assist torque corrected by the second correcting steering torque.

According to the above aspect, first and second rotational vibrations respectively generated in the first and second electric power steering devices are detected, and first and second correcting steering torques for respectively reducing the first and second rotational vibrations are calculated. Further, the first electric power steering device is controlled based on the first target steering assist torque corrected by the first correcting steering torque, and the second electric power steering device is controlled based on the second target steering corrected by the second correcting steering torque.

Thus, the first and second target steering assist torques are corrected respectively by the first and second correcting steering torques for reducing the first and second rotational vibrations respectively generated in the first and second electric power steering devices. Therefore, for example, as compared to where the first and second target steering assist torques are corrected by the correcting steering torque for reducing the rotational vibration caused by a disturbance reversely input to the first electric power steering device, the first and second rotational vibrations can be effectively reduced.

Further, in another aspect of the present disclosure, the steering torque detecting device is a first torque detecting device that is configured to detect a first torque in a first pinion shaft of the first electric power steering device as steering torque; a second pinion shaft of the second electric power steering device has a second torque detecting device that is configured to detect a second torque in the second pinion shaft in cooperation with an inertia weight fixed to the second pinion shaft, and; the control unit is configured to determine the first rotational vibration based on the first torque and determine the second rotational vibration based on the second torque.

According to the above aspect, a first torque in the first pinion shaft of the first electric power steering device is detected as a steering torque by the steering torque detecting device which is the first torque detecting device, and the first rotational vibration is detected based on the first torque. Further, in cooperation with the inertia weight, a second torque in the second pinion shaft is detected by the second torque detecting device, and the second rotational vibration is detected based on the second torque.

Therefore, since the first and second rotational vibrations are detected based on the first and second torques in the first and second pinion shafts of the first and second electric power steering devices, respectively, the first and second rotational vibrations can be detected based on the same physical quantity.

Further, in another aspect of the present disclosure, at least the second electric power steering device is configured to apply an assist torque to a pinion shaft by an electric motor including a rotary encoder; and the electronic control unit is configured to determine a first rotational vibration based on a steering torque detected by the steering torque detecting device and a second rotational vibration based on a rotational vibration of the electric motor of the second electric power steering device.

According to the above aspect, at least the second electric power steering device is configured to apply an assist torque to the pinion shaft by the electric motor, and the second rotational vibration is detected based on a rotational vibration of the electric motor. Since the electric motor includes the rotary encoder to control it, a rotational vibration of the electric motor can be detected based on the rotational position or rotational speed detected by the rotary encoder, and the second rotational vibration can be detected based on the detected rotational vibration. Therefore, a special detecting device such as a torque detecting device for detecting the second rotational vibration can be eliminated.

Further, in another aspect of the present disclosure, the left and right swing arm members each have first and second arm portions extending in directions different from each other with respect to the corresponding axes; the relay rod is pivotally attached at both ends to the first arm portions of the left and right swing arm members; the left and right tie rods are pivotally attached at their inner ends to one of the first arm portion of the corresponding swing arm member and the relay rod; and the first and second electric power steering devices are pivotally attached to the second arm portions of the one and the other swing arm members, respectively.

According to the above aspect, the left and right swing arm members have first and second arm portions extending in mutually different directions. Further, the relay rod is pivotally attached to the first arm portions of the one and the other swing arm members, and the first and second electric power steering devices are pivotally attached to the second arm portions of the one and the other swing arm members, respectively. Therefore, as compared to where each of the left and right swing arm members has only one arm portion, the relay rod and the first electric power steering device are pivotally attached to the common arm portion of one swing arm member, and the relay rod and the second electric power steering device are pivotally attached to the common arm portion of the other swing arm member, the degree of freedom in disposing of the first and second electric power steering devices can be increased.

Other objects, other features, and attendant advantages of the present disclosure will be readily understood from the description of the embodiments of the present disclosure described with reference to the following drawings.

DETAILED DESCRIPTION

The present disclosure will now be described in detail with reference to the accompanying drawings.

First Embodiment

Figure 1:
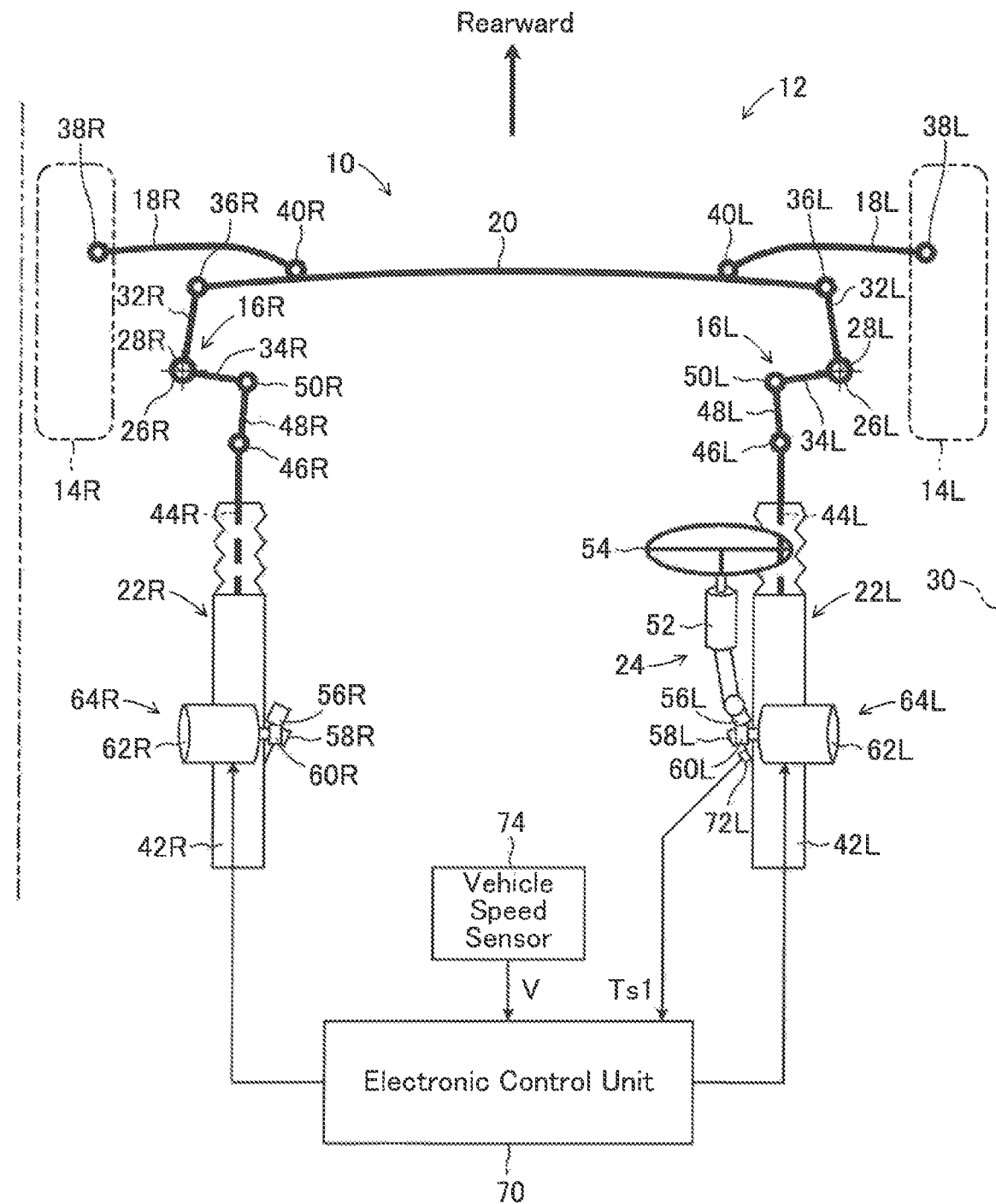
FIG. 1 is a schematic configuration diagram showing a steering apparatus for a vehicle according to the first embodiment of the present disclosure.

In FIG. 1, reference numeral 10 indicates a steering apparatus according to the embodiment of the present disclosure. The electric steering apparatus 10 is applied to a so-called left-hand drive vehicle 12, that is, a right-hand traffic vehicle, and is configured to steer left and right front wheels 14L and 14R that are steered wheels of the vehicle 12. The steering device 10 includes left and right swing arm members 16L and 16R, left and right tie rods 18L and 18R, a relay rod 20, a rack-and-pinion device 22, and a steering input transmission system 24.

The swing arm members 16L and 16R are disposed at positions spaced apart in the lateral direction of the vehicle 12 and are supported by a vehicle body 30 of the vehicle 12 to be able to swing about vertical axes 28L and 28R at boss portions 26L and 26R, respectively. In the illustrated embodiment, the swing arm members 16L and 16R have first arm portions 32L and 32R and second arm portions 34L and 34R, respectively. The first arm portions 32L and 32R respectively extend from the boss portions 26L and 26R substantially to the rear of the vehicle 12 when the vehicle is in a straight traveling state, and the second arm portions 34L and 34R respectively extend from the boss portions 26L and 26R in the inboard direction of the vehicle across the longitudinal direction of the vehicle.

The relay rod 20 extends in the lateral direction of the vehicle 12, and is pivotally connected at both ends to the first arm portions 32L, 32R of the left and right swing arm members 16L, 16R by joints 36L, 36R, respectively. The left and right tie rods 18L, 18R are pivotally connected at their outer ends to knuckle arms (not shown) of the left and right front wheels 14L, 14R by joints 38L, 38R, respectively, and are pivotally connected at their inner ends to neighbors of the corresponding ends of the relay rod 20 by joints 40L, 40R, respectively. Therefore, in the illustrated embodiment, the inner ends of the left and right tie rods 18L, 18R are pivotally connected to the first arm portions 32L, 32R of the left and right swing arm members 16L, 16R, respectively via the relay rod 20. Notably, the inner ends of the left and right tie rods 18L, 18R may be pivotally connected directly to the first arm portions 32L, 32R, respectively. Although the joints 40L and 40R are boated on the inboard side with respect to the joints 36L and 36R, they may be boated on the outboard side with respect to the joints 36L and 36R.

The rack-and-pinion device 22L and 22R are disposed on the left and right sides of the vehicle 12, respectively, and extends substantially in the longitudinal direction of the vehicle 12. The rack-and-pinion device 22L includes a housing 42L and a rack bar 44L extending along an axis of the housing, and the rack bar 44L extends out from the housing 42L toward the rear of the vehicle on the side of the rear end. The housing 42L is closed at the front end, and the rack bar 44L does not extend out toward the front of the vehicle from the housing 42L on the side of the front end but may extend out toward the front of the vehicle from the housing 42L.

One end of a connection link 48L is pivotally connected to the rear end of the rack bar 44L by a joint 46L, and the other end of the connection link 48L is pivotally connected to the second arm 34L of the left swing arm member 16L by a joint 50L. Accordingly, the rear end of the rack bar 44L is connected to the second arm portion 34L of the left swing arm member 16L via the connection link 48L so as to swing the swing arm member 16L about the corresponding axis 28L. Therefore, the reciprocating motion of the rack bar 44L is converted into a swing motion about the axis 28L by the connection link 48L and transmitted to the swing arm member 16L. Conversely, the swing motion of the swing arm member 16L about the axis 28L is converted into reciprocating motion by the connection link 48L and transmitted to the rack bar 44L.

Similarly, the rack-and-pinion device 22R includes a housing 42R and a rack bar 44R extending along an axis of the housing, and the rack bar 44R extends out from the housing 42R toward the rear of the vehicle on the side of the rear end. The housing 42R is closed at the front end, and the rack bar 44R does not extend out toward the front of the vehicle from the housing 42R on the side of the front end but may extend out toward the front of the vehicle from the housing 42R.

One end of a connection link 48R is pivotally connected to the rear end of the rack bar 44R by a joint 46R, and the other end of the connection link 48R is pivotally connected to the second arm 34R of the right swing arm member 16R by a joint 50R. Accordingly, the rear end of the rack bar 44R is connected to the second arm portion 34RL of the right swing arm member 16R via the connection link 48R so as to swing the swing arm member 16R about the corresponding axis 28R. Therefore, the reciprocating motion of the rack bar 44R is converted into a swing motion about the axis 28R by the connection link 48R and transmitted to the swing arm member 16R. Conversely, the swing motion of the swing arm member 16R about the axis 28R is converted into reciprocating motion by the connection link 48R and transmitted to the rack bar 44R.

Although joints such as the joint 36L and 36R are not shown in detail in FIG. 1, any joint known in the art can be used as long as the corresponding two members can be relatively pivotally connected. For example, a ball joint, a pillow ball, a combination of a pivot and a bush may be used.

Although not shown in detail in FIG. 1, the steering input transmission system 24 includes a known steering shaft 52 including an upper steering shaft, a lower steering shaft, universal joints, and the like. A steering wheel 54 operated by a driver is connected to an upper end of the steering shaft 52, and a lower end of the steering shaft 52 is connected to a pinion shaft 56L of the rack-and-pinion device 22L. Thus, the steering input transmission system 24 transmits a steering input given to the steering wheel 54 by the driver to the pinion shaft 56L.

In the illustrated embodiment, a worm wheel 58L is provided integrally with the pinion shaft 56L, and a worm 60L is screwed to the worm wheel 58L. The worm 60L is connected to an output shaft of an electric motor 62L. A torque of the electric motor 62L is transmitted to the pinion shaft 56L by the worm 60L and the worm wheel 58L as the steering assist torque. Therefore, the rack-and-pinion device 22L and the electric motor 62L cooperate to function as the first electric steering assist force applying device 64L of pinion assist rack-and-pinion type and generate steering assist torque.

Similarly, a worm wheel 58R is provided integrally with the pinion shaft 56R, and a worm 60R is screwed to the worm wheel 58R. The worm 60R is connected to an output shaft of an electric motor 62R. A torque of the electric motor 62R is transmitted to the pinion shaft 56R by the worm 60R and the worm wheel 58R as the steering assist torque. Therefore, the rack-and-pinion device 22R and the electric motor 62R cooperate to function as the second electric steering assist force applying device 64R of pinion assist rack-and-pinion type and generate steering assist torque.

As shown in FIG. 1, the steering apparatus 10 further includes an electronic control unit 70. Although not shown in detail in FIG. 1, a torque sensor 72L is provided on the pinion shaft 56L. The torque sensor 72L may have any configuration known in the art and detects a torque generated in the pinion shaft 56L as a steering torque Ts1.

As will be described in detail later, the electronic control unit 70 calculates first and second target steering assist torques Tst1 and Tst2 based on a steering torque Ts1 detected by the torque sensor 72L and a vehicle speed V detected by a vehicle speed sensor 74. The electronic control unit 70 controls output torques of the electric motors 62L and 62R based on the first and second target steering assist torques Tail and Tst2, respectively, to control the steering assist torques generated by the first and second electric power steering devices 64L and 64R.

Further, the electronic control unit 70 detects a rotational vibration caused by the disturbance input from at least one of the left and right front wheels 14L, 14R based on the steering torque Ts1 detected by the torque sensor 72L. When the level of the detected rotational vibration is equal to or higher than a reference value, the electronic control unit 70 calculates first and second correcting steering torques Tsa1 and Tsa2 for reducing the rotational vibration. Further, the electronic control unit 70 controls the first and second electric power steering devices 64L, 64R based on the first and second target steering assist torques Tsta1 and Tsta2 corrected by the first and second correcting steering torques Tsa1 and Tsa2.

Figure 2:
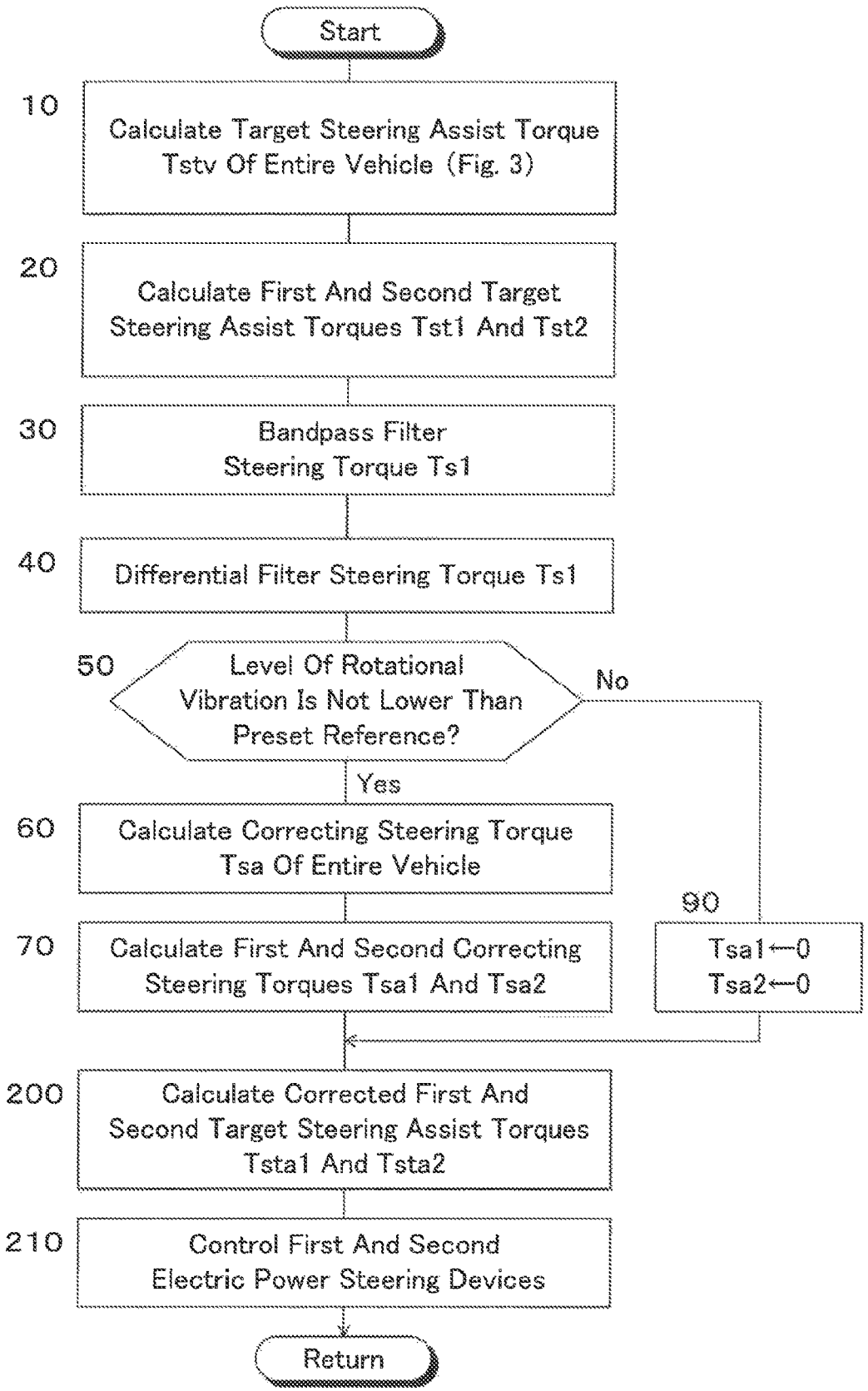
FIG. 2 is a flowchart showing a steering assist torque control routine according to the first embodiment.

Next, the control of the steering assist torque in the first embodiment will be described with reference to the flowchart shown in FIG. 2. The control according to the flowchart shown in FIG. 2 is repeatedly executed at predetermined time intervals by the electronic control unit 70 when an ignition switch (not shown) is turned on. Note that the control of the steering assist torque according to the flowchart shown in FIG. 2 is simply referred to as "the control". This also applies to steering assist torque control performed according to the corresponding flowcharts in other embodiments described later.

Figure 3:
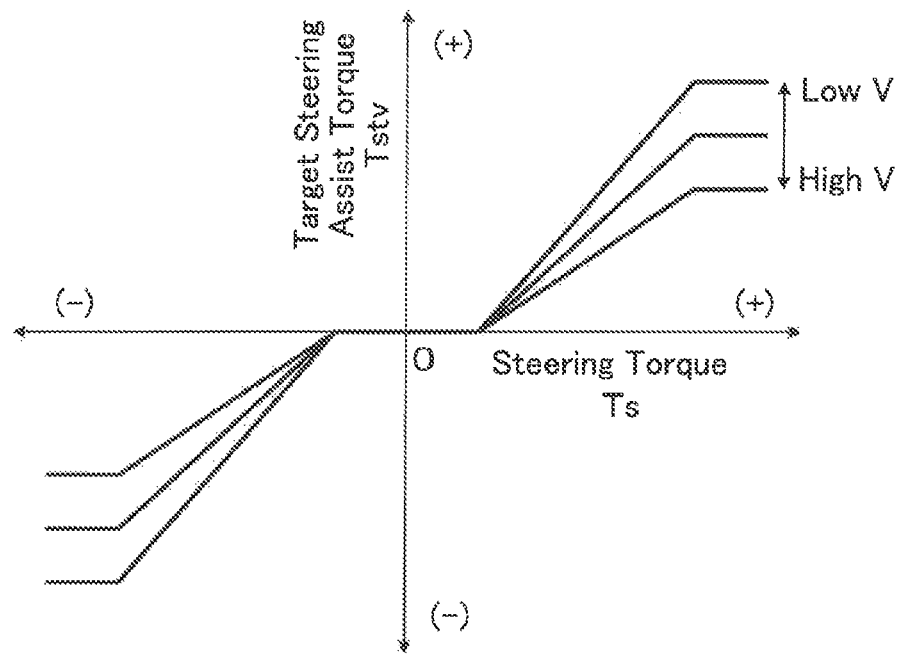
FIG. 3 is a map for calculating a target steering assist torque Tstv of the entire vehicle based on a steering torque Ts1 and a vehicle speed V.

First, in step 10, the signal indicating a steering torque Ts1 detected by the torque sensor 72L and the signal indicating a vehicle speed V detected by the vehicle speed sensor 74 are read. Further, the target steering assist torque Tstv of the entire vehicle is calculated from the map shown in FIG. 3 based on the steering torque Ts1 and the vehicle speed V. As shown in FIG. 3, the target steering assist torque Tstv is calculated to increase as the absolute value of the steering torque Ts increases and decrease as the vehicle speed V increases.

In step 20, the first and second target steering assist torques Tst1 and Tst2 are calculated to be ½ of the target steering assist torque Tstv. Notably, the first and second target steering assist torques Tst1 and Tst2 may be calculated to have different values as long as the sum of the first and second target steering assist torques is the target steering assist torque Tstv.

In step 30, the steering torque Ts1 is bandpass filtered. The passband of the band-pass filter is set in advance based on the resonance rotational frequency of the steering wheel 54 and the like such that the steering input transmission system 24 and the steering wheel 54 are so arranged that a rotational vibration of the steering wheel caused by a disturbance input from at least one of the left and right front wheels 14L, 14R is effectively reduced.

Figure 4:
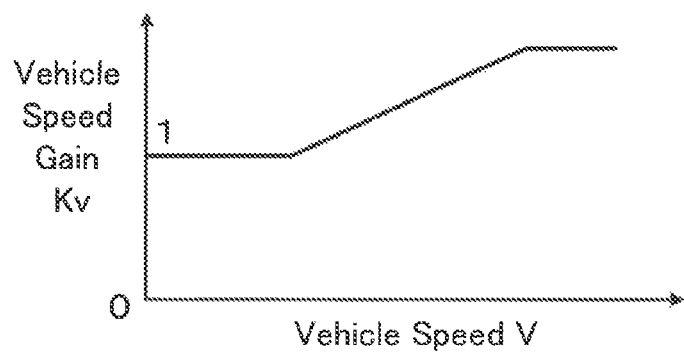
FIG. 4 is a map for calculating a vehicle speed coefficient Kv based on a vehicle speed V.

In step 40, the steering torque Ts1 that has been bandpass filtered is subjected to differential filtering to advance the phase of an excitation torque caused by the disturbance. Further, a vehicle speed coefficient Kv is calculated from the map shown in FIG. 4 based on the vehicle speed V, and the excitation torque whose phase is advanced is multiplied by the vehicle speed coefficient Kv. Note that, as shown in FIG. 4, the vehicle speed coefficient Kv is calculated to be a positive value that increases as the vehicle speed V increases.

In step 50, a determination is made as to whether or not a level of the rotational vibration caused by a disturbance is equal to or higher than a preset reference value based on an amplitude of the excitation torque obtained in step 40. When a negative determination is made, the control proceeds to step 90, and when an affirmative determination is made, the control proceeds to step 60.

In step 60, a correcting steering torque Tsa of the entire vehicle for reducing the rotational vibration of the steering wheel 54 is calculated based on the vibration torque obtained in step 40. The correcting steering torque Tsa of the entire vehicle may be, for example, a sign-inverted value of the vibration torque obtained in step 40.

In step 70, first and second correcting steering torques Tsa1 and Tsa2 for reducing the rotational vibration of the steering wheel 54 are calculated according to the following equations (1) and (2), respectively. In the following equations (1) and (2), R1 is a distribution coefficient to the first corrected steering torque Tsa1, and is a constant of 1 or less, larger than 0, and preferably larger than 0.5.

$$Tsa1 = R1 \cdot Tsa \quad (1)$$

$$Tsa2 \leq (1-R1)Tsa \quad (2)$$

In step 90, since it is not necessary to reduce the rotational vibration of the steering wheel 54, the first and second correcting steering torques Tsa1 and Tsa2 are set to zero.

In step 200, the first and second target steering assist torques Teta1 and Tsta2 corrected by the first and second correcting steering torques Tsa1 and Tsa2 are calculated according to the following equations (3) and (4), respectively.

$$Tata1 = Tst1 + Tsa1 \quad (3)$$

$$Tsta2 = Tst2 + Tsa2 \quad (4)$$

In step 210, the first and second electric power steering devices 64L and 64R are controlled so that the assist torques generated by the first and second electric power steering devices 64L and 64R become the corrected first and second target steering assist torques Tsta1 and Tsta2, respectively.

According to the first embodiment, in step 10, a target steering assist torque Tstv of the entire vehicle is calculated based on a steering torque Ts1 and a vehicle speed V, and in step 20, the first and second target steering assist torques Tst1 and Tst2 are calculated to be ½ of the target steering assist torque Tstv.

In step 30, the steering torque Ts1 is subjected to bandpass filtering, and in step 40, the band-pass filtered steering torque Ts1 is subjected to differential filtering to advance the phase of an excitation torque caused by a disturbance. Further, the excitation torque whose phase is advanced is multiplied by a vehicle speed coefficient Kv.

When it is determined in step 50 that the level of the rotational vibration caused by the disturbance is equal to or greater than the preset reference value, correcting steering torques Tsa1 and Tsa2 for reducing the rotational vibration of the steering wheel 54 are calculated in steps 60 and 70. Further, in steps 200 and 210, the first and second electric power steering devices 64L and 64R are controlled based on the first and second target steering assist torques Tata1 and Tsta2 corrected by the first and second correcting steering torques Tsa1 and Tsa2, respectively.

Particularly, according to the first embodiment, in step 60, a correcting steering torque Tsa of the entire vehicle is calculated based on the vibration torque obtained in step 40, and in step 70, first and second correcting steering torques Tsa1 and Tsa2 are calculated according to the above-mentioned equations (1) and (2), respectively. Therefore, it is possible to correct the first and second target steering assist torques Tst1 and Tst2 by the first and second corrected steering torques Tsa1 and Tsa2, respectively, and to control the first and second electric power steering devices 64L and 64R based on the corrected first and second target steering assist torques Tata1 and Tsta2.

Therefore, as compared to where only the first target steering assist torque is corrected by the correcting steering torque, the rotational vibration transmitted from the second swing arm member 16L to the steering wheel 54 via the relay rod 20 and the first swing arm member 16R can be effectively reduced. Thus, it is possible to effectively reduce the possibility that the driver feels uncomfortable due to the rotational vibration of the steering wheel 54. Note that the same effect as this can be obtained in the other embodiments described later.

Further, according to the first embodiment, in step 70, the first and second correcting steering torques Tsa1 and Tsa2 are calculated according to the above-mentioned equations (1) and (2), respectively. Therefore, by setting the distribution coefficient R1 to the first correcting steering torque Tsa1, the distribution of the correcting steering torque Tsa of the entire vehicle to the first and second correcting steering torques Tsa1 and Tsa2 can be appropriately set according to the characteristics of the vehicle to which the present disclosure is applied.

Second Embodiment

Figure 5:
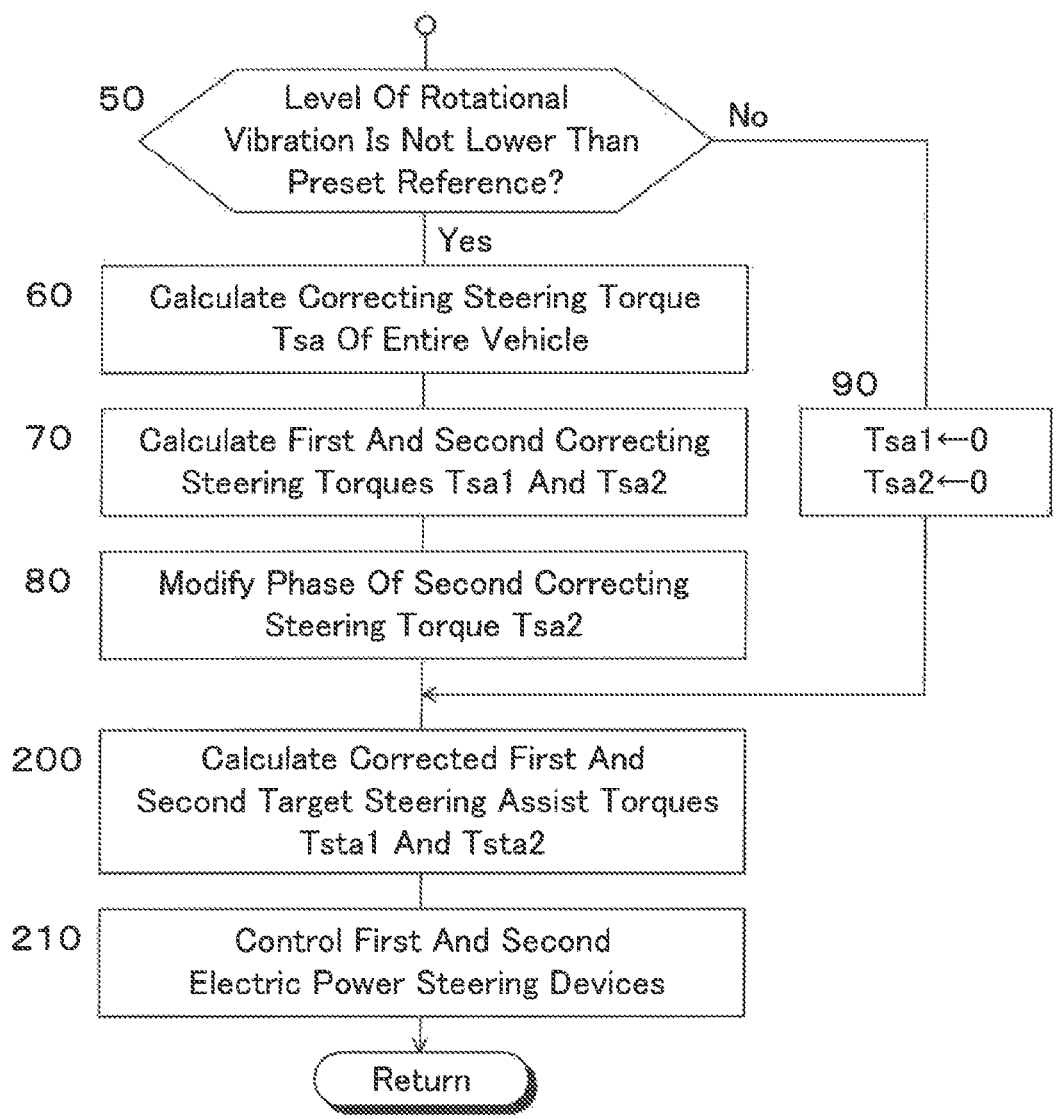
FIG. 5 is a flowchart showing a main part of a steering assist torque control routine in a second embodiment configured as a modified example of the first embodiment.

FIG. 5 is a flowchart showing the main part of a steering assist torque control routine according to the second embodiment, which is configured as a modification of the first embodiment. In FIG. 5, the same step numbers as those shown in FIG. 2 are assigned to the same steps as those shown in FIG. 2. This also applies to the other embodiments to be described later.

Although steps 10 to 40 are not shown in FIG. 5, steps 10 to 70 and step 90 are executed as in the first embodiment, and when step 70 is completed, the control proceeds to step 80.

In step 80, the phase of the second correcting steering torque Tsa2 calculated in step 70 is modified so that the phase of the second correcting steering torque advances with respect to the first correcting steering torque. A magnitude of the advanced phase is set in advance based on the time required for the disturbance to be transmitted from the left front wheel 14L side to the steering input transmission system 24 via the second swing arm member 16L, the relay rod 20, and the like. When step 80 is completed, steps 200 and 210 are executed as in the first embodiment.

According to the second embodiment, the phase of the second correcting steering torque Tsa2 is advanced by executing step 80 after step 70, so that the phase of the second correcting steering torque is advanced with respect to the first correcting steering torque. Therefore, as compared to where the phase of the second correcting steering torque is not advanced, rotational vibration transmitted from the second swing arm member to the steering input transmission system via the relay rod and the first swing arm member can be effectively reduced.

According to the first and second embodiments, when the distribution coefficient R1 is 0.5, the first and second correcting steering torques Tsa1 and Tsa2 are calculated to have the same value so that the first and second target steering assist torques Tst1 and Tst2 can be corrected with the same value. However, as described above, the degree of contribution of the rotational vibration in the first electric power steering device 64L to the rotational vibration of the steering wheel 54 is higher than the degree of contribution of the rotational vibration in the second electric power steering device 64R. When the distribution coefficient R1 is larger than 0.5, the first correcting steering torque Tsa1 is calculated to be larger than the second corrected steering torque Tsa2. Therefore, as compared to where the first correcting steering torque is equal to or less than the second correcting steering torque, the rotational vibration of the steering wheel 54 can be effectively reduced.

Third Embodiment

Figure 6:
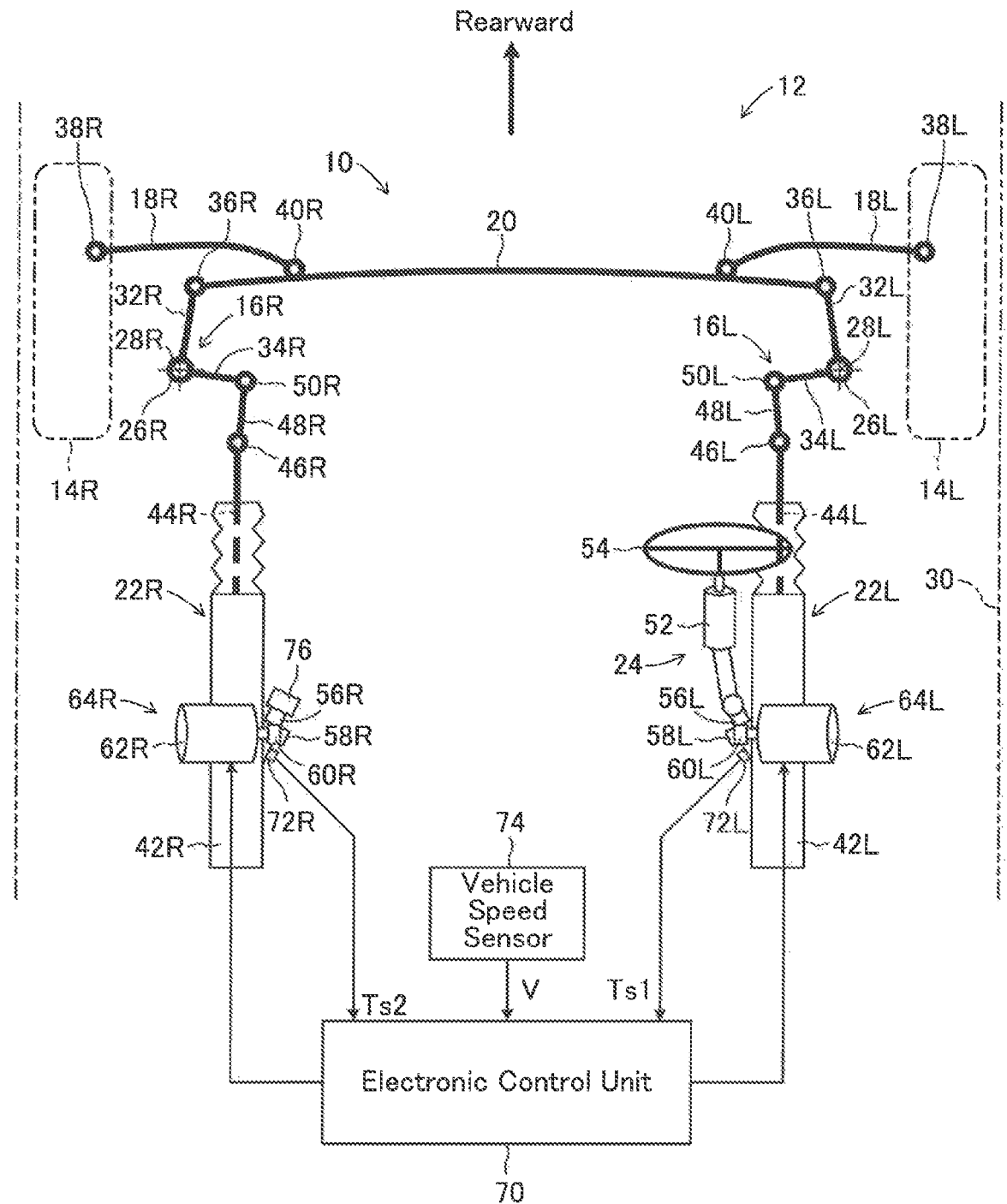
FIG. 6 is a schematic configuration diagram showing a steering apparatus for a vehicle according to a third embodiment of the present disclosure.

FIG. 6 shows a vehicle steering apparatus 10 according to a third embodiment of the present disclosure. In FIG. 6, the same members as those shown in FIG. 1 are designated by the same reference numerals as those shown in FIG. This also applies to FIG. 8 described later.

In the third embodiment, a torque sensor 72R is also provided on the pinion shaft 56R of the second electric power steering device 64R. Like the torque sensor 72L, the torque sensor 72R may have any configuration known in the art and detects a torque generated in the pinion shaft 56R as a steering torque Ts2. A signal indicating the steering torque Ts2 is input to the electronic control unit 70. In particular, an inertia weight 76 is fixed to the tip of the pinion shaft 56R, and the torque sensor 72R is provided between the inertia weight 76 and the second electric power steering device 64R. The other points of the third embodiment are the same as those of the first and second embodiments.

Figure 7:
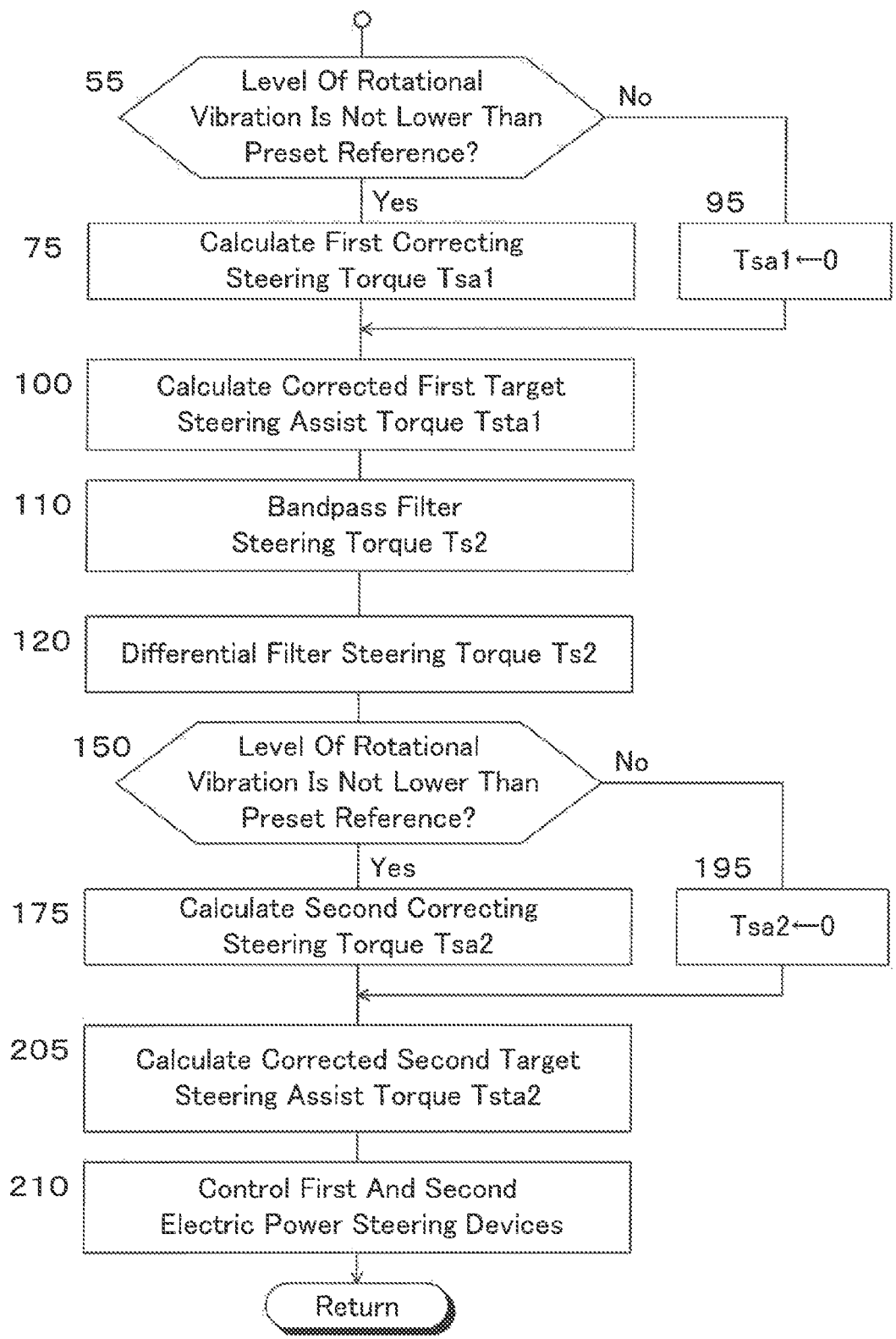
FIG. 7 is a flowchart showing a main part of a steering assist torque control routine according to the third embodiment.

Next, a steering assist torque control routine in the third embodiment will be described with reference to the flowchart shown in FIG. 7.

In the third embodiment, steps 10 to 40 are executed similarly to the first embodiment, and when step 40 is completed, the control proceeds to step 55.

In step 55, similar to step 50 in the first embodiment, a determination is made as to whether or not the level of rotational vibration caused by a disturbance in the first electric power steering device 64L is equal to or larger than the reference value based on an amplitude of the excitation torque obtained in step 40. When a negative determination is made, the control proceeds to step 95, and when an affirmative determination is made, the control proceeds to step 75.

In step 75, the first correcting steering torque Tsa1 for reducing the rotational vibration of the steering wheel 54 is calculated as the sign inversion value of the excitation torque obtained in step 40.

In step 95, the first correcting steering torque Tsa1 is set to zero. Upon completion of step 75 or 95, the control proceeds to step 100.

In step 100, the first target steering assist torque Tsta1 corrected by the first correcting steering torque Tsa1 is calculated according to the above-mentioned equation (3).

In step 110, the steering torque Ts2 is subjected to band-pass filtering. The passband of the band-pass filter is preset based on the steering input transmission system 24 and the resonance rotational frequency of the steering wheel 54 so that the rotational vibration of the steering wheel 54 which is mainly caused by a disturbance input from the left front wheel 14L is effectively reduced.

In step 120, the steering torque Ts2 that has been subjected to band-pass filtering is subjected to differential filtering to advance the phase of the excitation torque mainly caused by a disturbance reversely input from the right front wheel 14R.

In step 150, a determination is made as to whether or not a level of the rotational vibration caused by a disturbance in the second electric power steering device 64R is equal to or greater than a preset reference value based on an amplitude of the excitation torque obtained in step 120. When a negative determination is made, the control proceeds to step 195, and when an affirmative determination is made, the control proceeds to step 175.

In step 175, a second correcting steering torque Tsa2 for reducing the rotational vibration of the steering wheel 54 is calculated as a sign inversion value of the excitation torque obtained in step 120.

In step 195, the second correcting steering torque Tsa2 is set to 0. Upon completion of step 175 or 195, the control proceeds to step 205.

In step 205, the second target steering assist torque Tsta2 corrected by the second correcting steering torque Tsa2 is calculated according to the above-mentioned equation (4).

Upon completion of step 205, the control proceeds to step 210, and step 210 is executed as in the first and second embodiments.

According to the third embodiment, a torque sensor 72R is also provided on the pinion shaft 56R of the second electric power steering device 64R, and a torque generated in the pinion shaft 56R is detected as a steering torque Ts2. When it is determined in step 55 that the level of rotational vibration caused by the disturbance in the first electric power steering device 64L is equal to or greater than the preset reference value, in step 75, a first correcting steering torque Tsa1 is calculated, and steps 110, 120 and 150 are further executed.

In step 110, the steering torque Ts2 is subjected to band-pass filtering, and in step 120, a phase of the exciting torque mainly due to a disturbance reversely input from the left front wheel 14L is advanced. Further, when it is determined in step 150 that the level of rotational vibration caused by the disturbance in the second electric power steering device 64R is equal to or greater than the preset reference value, in step 175, the second correcting steering torque Tsa2 is calculated.

Therefore, according to the third embodiment, the first and second correcting steering torques Tsa1 and Tsa2 are calculated based on the rotational vibrations caused by the disturbances in the first and second electric power steering devices 64L and 64R, respectively. In other words, the first and second correcting steering torques Tsa1 and Tsa2 are calculated as correcting steering torques for reducing the rotational vibrations caused by the disturbances that are reversely inputted to the first and second electric power steering devices 64L and 64R, respectively. Therefore, rotational vibrations in the first and second electric power steering devices can be effectively reduced as compared to, for example, the first and second embodiments in which the first and second target steering assist torques are corrected by a correcting steering torque for reducing rotational vibration caused by a disturbance that is reversely inputted to the first electric power steering device.

Fourth Embodiment

Figure 8:
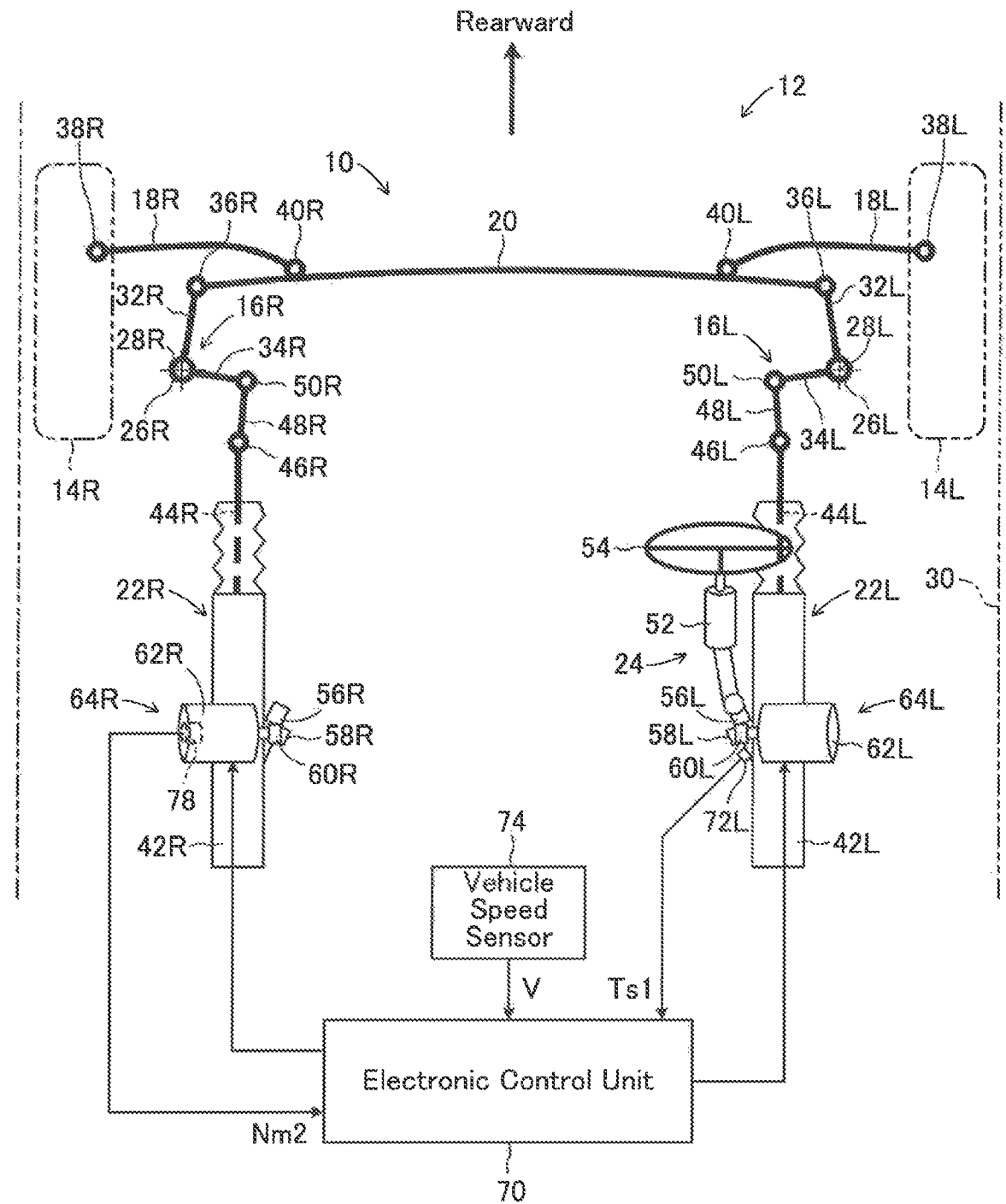
FIG. 8 is a schematic configuration diagram showing a steering apparatus for a vehicle according to a fourth embodiment of the present disclosure.

FIG. 8 shows a vehicle steering apparatus 10 according to the fourth embodiment of the present disclosure. In the fourth embodiment, the torque sensor 72R in the third embodiment is not provided, so that the signal indicating the steering torque Ts2 is not input to the electronic control unit 70. A rotary position Pm2 of the electric motor 62R of the second electric power steering device 64R is detected by a rotary encoder 78 incorporated in the electric motor 62R, and a signal indicating the rotational position Prn2 is input to the electronic control unit 70. As will be described in detail later, the electronic control unit 70 estimates an excitation torque of the rotational vibration caused by a disturbance in the second electric power steering device 64R based on the rotational position Pm2.

Figure 9:
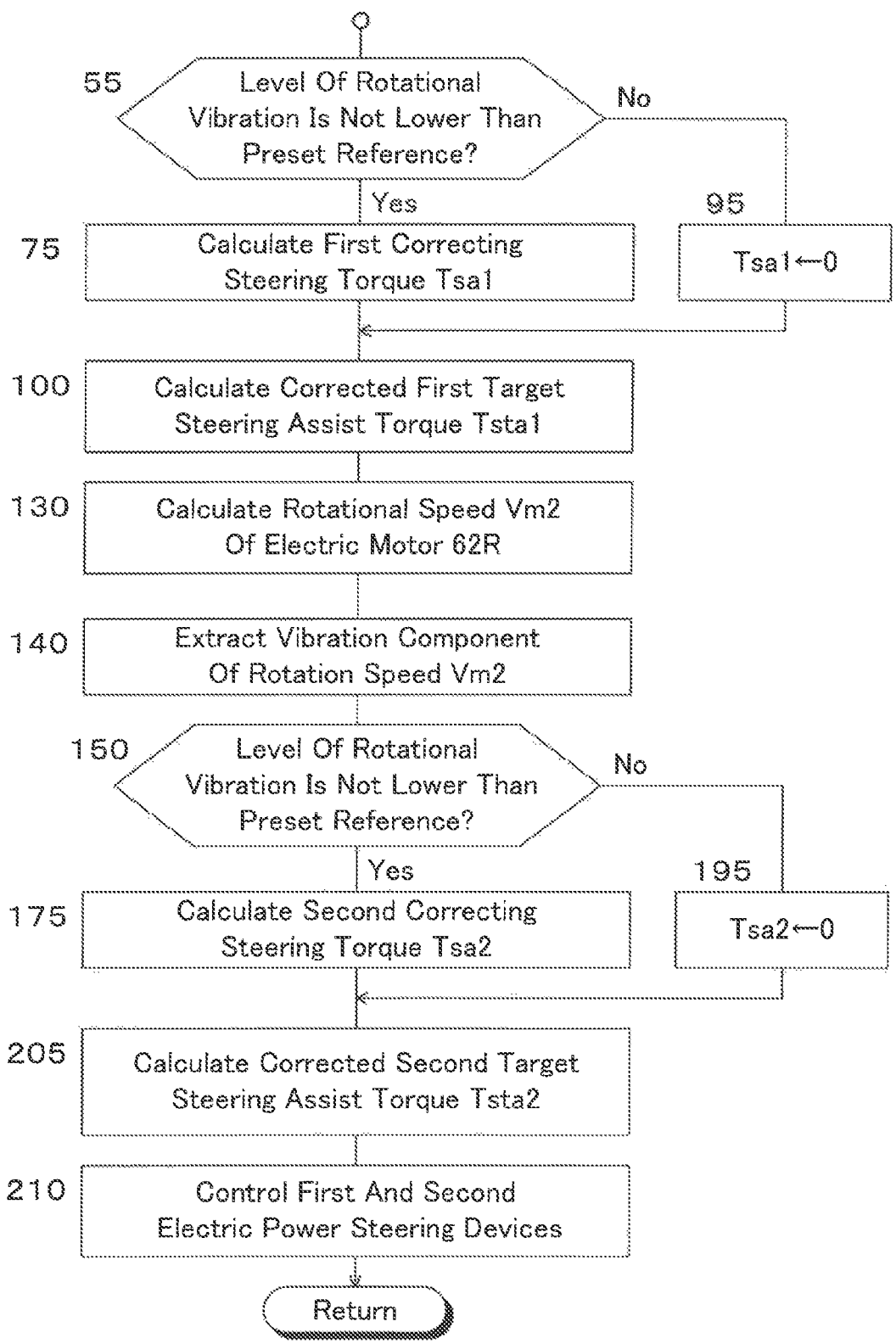
FIG. 9 is a flowchart showing a main part of a steering assist torque control routine according to the fourth embodiment.

Next, a steering assist torque control routine in the fourth embodiment will be described with reference to the flowchart shown in FIG. 9.

In the fourth embodiment, steps 10 to 100 are executed as in the third embodiment, and when step 100 is completed, the control proceeds to step 130. Further, steps 150 to 210 are executed similarly to the third embodiment.

In step 130, the rotational speed Vm2 of the electric motor 62R is calculated as a time differential value of the rotational position Pm2 of the electric motor 62R detected by the rotary encoder 78. A signal indicating the rotation speed Vm2 of the electric motor 52R may be input from the rotary encoder to the electronic control unit 70, in which case step 130 is omitted.

In step 140, a vibration component of the rotation speed Vm2 of the electric motor 62R is extracted and based on the vibration component of the rotation speed Vm2, an excitation torque of the rotation vibration caused by the disturbance in the second electric power steering device 64R is estimated in a manner known in the art. When step 140 is completed, the control proceeds to step 150, and in step 150, a determination of a level of rotational vibration is performed based on the vibration torque estimated in step 140. The determination of the level of rotational vibration may be made based on a vibration component of the rotation speed Vm2.

According to the fourth embodiment, upon completion of step 100 in the third embodiment, steps 130 and 140 are executed instead of steps 110 and 120. In step 130, a rotational speed Vm2 of the electric motor 62R is calculated as a time differential value of the rotational speed Nm2 of the electric motor 62R, and in step 140, an excitation torque of the rotational vibration caused by a disturbance in the second electric power steering device 64R is estimated based on a vibration component of the rotational speed Vm2. Further, in step 150, a level of rotational vibration is determined based on the excitation torque estimated in step 140.

The exciting torque of the rotational vibration is estimated based on the rotational speed Vm2 which is a time differential value of the rotational position Pmt detected by the rotary encoder 78 incorporated in the electric motor 62R of the second electric power steering device 64R. Therefore, the torque sensor 72R and the inertia weight 76 in the third embodiment are unnecessary, and an electric motor is usually provided with a rotary encoder. Therefore, according to the fourth embodiment, it is possible to reduce the number of parts required for the steering apparatus 10 to reduce the cost and to simplify the structure, as compared with the third embodiment.

Particularly, according to the above-described first to fourth embodiments, the left and right swing arm members 16L and 16R have the first arm portions 32L, 32R and the second arm portions 34L, 34R extending in different directions with respect to the axes 28L and 28R, respectively. The relay rod 20 is pivotally attached at both ends to the first arm portions 32L and 32R of the left and right swing arm members 16L and 16R, and the left and right tie rods 18L and 18R are pivotally attached at their inner ends to the first arm portions 32L and 32R of the swing arm members 16L and 16R via the relay rod 20. The first and second electric power steering devices 64L and 64R are pivotally attached to the second arm portions 34L and 34R of the left and right swing arm members 16L and 16R, respectively.

Therefore, as compared to where each of the left and right swing arm members 16L and 16R has only one arm portion, the degree of freedom in pivoting the first and second electric power steering devices 64L and 64R and the relay rod 20 can be increased, and the mountability of the steering apparatus 10 on a vehicle and the degree of freedom in designing a vehicle can be improved. In particular, extending directions of the electric power steering devices 64L and 64R can be freely set by setting extending directions of the second arm portions 34L and 34R with respect to the first arm portions 32L and 32R.

In general, a rack-assist type electric power steering device includes a ball screw for converting motion between rotary motion and linear motion in a transmission system for an assist torque by an electric motor, whereas a pinion assist type electric power steering device does not include a ball screw. Therefore, the problem of rotational vibration caused by the reverse input of a disturbance is more prominent when the electric power steering device is the pinion assist type than when the electric power steering device is the rack assist type.

According to the first to fourth embodiments described above, the electric power steering devices 64L and 64R are pinion assist type electric power steering devices, but the rotational vibration is estimated based on the torque of the pinion shaft or a rotational speed of the electric motor corresponding to a rotational speed of the pinion shaft. Further, a damping torque generated by the electric motor corresponding to the first and second correcting steering torques Tsa1 and Tsa2 for reducing the rotational vibration is applied to the pinion shaft. Therefore, it is possible to effectively reduce the rotational vibration caused by the reverse input of a disturbance.

Although the present disclosure has been described in detail with reference to specific embodiments, it will be apparent to those skilled in the art that the present disclosure is not limited to the above-described embodiments, and various other embodiments are possible within the scope of the present disclosure.

For example, in each of the above-described embodiments, the rotational vibration caused by a disturbance is estimated based on a steering torque, and in the fourth embodiment, a rotational vibration caused by a disturbance is estimated based on a rotation speed Vm2 of the electric motor 62L. However, a rotational vibration may be estimated based on a steering torque and a rotation speed of the electric motor and may be estimated by any method known in the art.

Further, in each of the above-described embodiments, the first and second electric power steering devices 64L and 64R are pinion assist type rack-and-pinion power steering devices but may be rack assist type rack-and-pinion power steering devices.

Further, in each of the above-described embodiments, the swing arm members 16L and 16R have first arm portions 32L and 32R and second arm portions 34L and 34R, respectively, but each arm portion may be one. The first arm portions 32L and 32R extend substantially rearward of the vehicle from the boss portions 26L and 26R, respectively, when the vehicle 12 is in a straight traveling state, and the second arm portions 34L and 34R extend in the vehicle inboard direction from the boss portions 26L and 26R, respectively, across the front-rear direction of the vehicle. However, the first arm portions 32L and 32R may extend substantially forward of the vehicle, and the second arm portions 34L and 34R may extend in a direction different from the illustrated direction including the outboard direction of the vehicle. Therefore, the rack-and-pinion devices 22L and 22R may extend in directions other than the front-rear direction of the vehicle.

Further, in each of the above-described embodiments, the inner ends of the left and right tie rods 18L and 18R are pivotally attached near the corresponding ends of the relay rod 20, but are pivotally attached to the first arm portions 32L and 32R of the swing arm members 16L and 16R, respectively.

Further, in each of the above-described embodiments, the steering device 10 is applied to a so-called left-hand drive vehicle, that is, a right lane traveling vehicle 12, but may be applied to a so-called right-hand drive vehicle, that is, a left lane traveling vehicle 12. In that case, the rack-and-pinion device 22L in each embodiment is arranged on the right side of the vehicle 12, and the rack-and-pinion device 22R is arranged on the left side of the vehicle 12.

Further, in each of the above-described embodiments, the steering device 10 is configured to steer the left and right front wheels 14L and 14R that are the steered wheels of the vehicle 12 but may be configured to steer the left and right rear wheels.

What is claimed is:

1. A steering apparatus for a vehicle which comprises:
left and right swing arm members each having an arm portion that swings about an axis extending in the vertical direction,
a relay rod pivotally connected to the respective arm portions of the left and right swing arm members at both ends,
left and right tie rods respectively pivotally connected to left and right steered wheels, respectively, at outer ends, and to the relay rod or the arm portions of the left and right swing arm members, respectively, at inner ends, and
a steering input transmission system that is configured to transmit a steering input given to a steering wheel to one of the swing arm members, wherein
the steering apparatus comprises a first rack-and-pinion type electric power steering device having a first rack bar connected to the arm portion of the one swing arm member, a second rack-and-pinion type electric power steering device having a second rack bar connected to the arm portion of the other swing arm member, a steering torque detecting device that is configured to detect a steering torque applied to the steering input transmission system via the steering wheel, and an electronic control unit that is configured to calculate first and second target steering assist torques based on at least the steering torque detected by the steering torque detecting device and control the first and second electric power steering devices based on the first and second target steering assist torques, respectively,
the electronic control unit is configured to detect a rotational vibration generated in at least the first electric power steering device due to a disturbance, calculate a correcting steering torque for reducing the rotational vibration, and correct at least the first target steering assist torque with the correcting steering torque.

2. The steering apparatus for a vehicle according to claim 1, wherein the electronic control unit is configured to calculate, based on the calculated correcting steering torque, first and second correcting steering torques for reducing rotational vibration generated in the first electric power steering device and correct the first and second target steering assist torques with the first and second correcting steering torques, respectively.

3. The steering apparatus for a vehicle according to claim 2, wherein the electronic control unit is configured to calculate a correcting steering torque of the entire vehicle for reducing rotational vibration generated in the first electric power steering device and calculate first and second correcting steering torques based on the correcting steering torque of the entire vehicle so that the first correcting steering torque is larger than the second correcting steering torque.

4. The steering apparatus for a vehicle according to claim 1, wherein the electronic control unit is configured to calculate, based on the calculated correcting steering torque, first and second correcting steering torques for reducing rotational vibration generated in the first electric power steering device, correct the first target steering assist torque with the first correcting steering torque, modify the second correcting steering torque so that a phase of the second correcting steering torque advances with respect to the first correcting steering torque, and correct the second target steering assist torque with the modified second correcting steering torque.

5. The steering apparatus for a vehicle according to claim 1, wherein, the detected rotational vibration is a first rotational vibration of the first electric power steering device, and the electronic control unit is further configured to:
- determine a second rotational vibration generated in the second electric power steering device,
- calculate, based on the calculated correcting steering torque, first and second correcting steering torques for reducing the first and second rotational vibrations, respectively,
- control the first electric power steering device based on the first target steering assist torque corrected by the first correcting steering torque, and
- control the second electric power steering device based on the second target steering assist torque corrected by the second correcting steering torque.

6. The steering apparatus for a vehicle according to claim 5, wherein the steering torque detecting device is a first torque detecting device that is configured to detect a first torque in a first pinion shaft of the first electric power steering device as steering torque; a second pinion shaft of the second electric power steering device has a second torque detecting device that is configured to detect a second torque in the second pinion shaft in cooperation with an inertia weight fixed to the second pinion shaft, and; the electronic control unit is configured to determine the first rotational vibration based on the first torque and determine the second rotational vibration based on the second torque.

7. The steering apparatus for a vehicle according to claim 5, wherein at least the second electric power steering device is configured to apply an assist torque to a pinion shaft by an electric motor including a rotary encoder, and; the electronic control unit is configured to determine a first rotational vibration based on a steering torque detected by the steering torque detecting device and a second rotational vibration based on a rotational vibration of the electric motor of the second electric power steering device.

8. The steering apparatus for a vehicle according to claim 1, wherein
- the arm portion of the respective left and right swing arm members each include first and second arm portions extending in directions different from each other with respect to the corresponding axes;
- the relay rod is pivotally attached at both ends to the first arm portions of the left and right swing arm members;
- the left and right tie rods are pivotally attached at their inner ends to one of the first arm portion of the corresponding swing arm member and the relay rod; and
- the first and second electric power steering devices are pivotally attached to the second arm portions of the one and the other swing arm members, respectively.

* * * * *